United States Patent [19]

Michel

[11] Patent Number: 5,259,261
[45] Date of Patent: Nov. 9, 1993

[54] ACTUATING DRIVE COMPRISING TWO FRICTION PARTNERS

[75] Inventor: Peter Michel, Kleinrinderfeld, Fed. Rep. of Germany

[73] Assignee: Siemens Aktiengesellschaft, Munich, Fed. Rep. of Germany

[21] Appl. No.: 886,958

[22] Filed: May 21, 1992

[30] Foreign Application Priority Data

May 21, 1991 [EP] European Pat. Off. ........ 91108179.2

[51] Int. Cl.$^5$ ............................................. F16H 1/18
[52] U.S. Cl. .................................. 74/425; 403/225; 464/89; 464/92
[58] Field of Search .............. 74/425, 724, 443, 89.14, 74/89.22; 403/223, 225, 227, 359; 464/60, 89, 92, 93

[56] References Cited

U.S. PATENT DOCUMENTS

| | | | |
|---|---|---|---|
| 2,479,278 | 8/1949 | Tessendorf et al. | 64/11 |
| 3,976,342 | 8/1976 | Leyendecker et al. | 308/237 |
| 4,643,040 | 2/1987 | Adam et al. | 74/425 |
| 5,040,430 | 8/1991 | Adam et al. | 74/425 |

FOREIGN PATENT DOCUMENTS

| | | |
|---|---|---|
| 8903714 | 1/1990 | Fed. Rep. of Germany . |
| 2193441 | 2/1974 | France . |
| 590529 | 4/1959 | Italy ........................ 464/89 |
| 58-170944 | 10/1983 | Japan ...................... 464/89 |
| WO86/00380 | 1/1986 | PCT Int'l Appl. . |

*Primary Examiner*—Allan D. Herrmann
*Assistant Examiner*—William O. Trousdell
*Attorney, Agent, or Firm*—Kenyon & Kenyon

[57] ABSTRACT

The invention is used in an actuating drive comprising two friction partners, in particular a geared actuating drive with a toothed worm wheel which braces itself radially with a cup-shaped edge part against an outer rim part of a concentric slave disc which is driven over an at least tangentially elastic damping liner. The invention is designed to prevent squeaking noises between the friction partners when there is reciprocal relative movement, and to require minimal expenditure of time and energy for construction and assembly. The invention provides in each case for the one rim part to have an even edge surface and for the other rim part to have an uneven friction surface, with elevations only abutting on the one friction surface and with depressions situated inbetween. An application is particularly suited for motor-vehicle window-lifting drives and can be used between the worm wheel and over a tangentially elastic damping liner, giving a reciprocal, radial bracing of the slave disc which is in a slaving relationship.

6 Claims, 2 Drawing Sheets

ACTUATING DRIVE COMPRISING TWO FRICTION PARTNERS

BACKGROUND OF THE INVENTION

The present invention relates to an actuating drive comprising two friction partners. A related actuating drive for a motor vehicle's window-lifting mechanism is disclosed in DE-U-89 03 714.

In electromotive window-lifting drives it is desirable to damp the abruptly braked driving torque when the upper or lower limit-stop point of the lifter mechanism is reached. To accomplish this result in the door of a motor vehicle, a rubber disc is installed as a damping liner between the worm gear wheel driven by the electromotor and the driven or slave disc connected to the output of the window lifter. This rubber disc allows a certain tangential compliance between the worm wheel and the slave disc when the limit-stop point is run up against. With a cup-shaped edge, the worm wheel overlaps the outer rim of the driven disc to such an extent that it can brace itself radially against this driven disc when the gearing forces of the worm shaft act on the worm wheel. When there is a simultaneous bracing action and relative movement between the worm wheel and the slave disc, undesirable squeaking noises can result.

SUMMARY OF THE INVENTION

It is the objective of the present invention that, given a reciprocal relative movement between the worm wheel and the slave disc, squeaking noises are prevented. This is done using a mechanism which is simple to construct and assemble, and which has a long operational service live.

Given relative movement between the friction partners (the worm wheel and the slave disc), in the present invention squeaking noises can be avoided by configuring recesses in the area of the cup-shaped edge. Because frictional contact then exists only in the area of the radial elevations, so that there is a corresponding reduction in the contact surface between the two friction partners, other operational characteristics of the mechanism are not adversely affected. Thus, the present invention operates without special lubrication as was necessary in previous known devices. If a lubricant is used, one refinement of the invention is to use the radial depressions as pockets for storing lubricant. This refinement is particularly useful when long operational service lives re needed and harsh operating conditions exist. This lubrication is done in a way that prevents the lubricant from being pushed out in an undesirable manner. The result is that during relative movement between the friction partners, lubricant is delivered between the two friction partners through the appropriately designed recesses which are in the form of radial depressions.

BRIEF DESCRIPTION OF THE DRAWINGS

The invention as well as further advantageous refinements of the invention are shown in greater detail in the following on the basis of schematically depicted exemplified embodiments in the drawing. The figures depict.

DESCRIPTION OF THE PREFERRED EMBODIMENT

Figure 1:
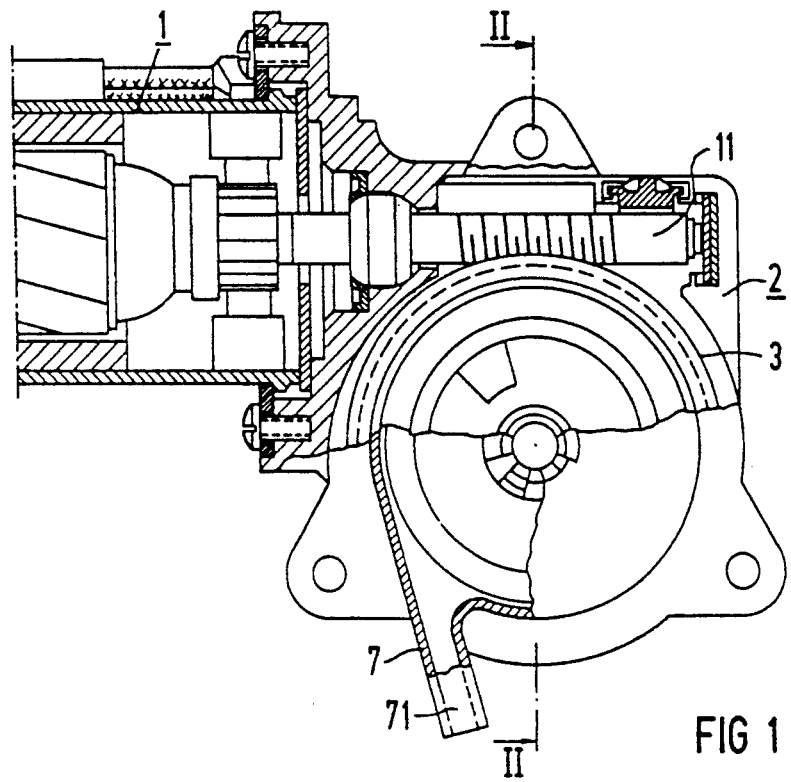
FIG. 1 is an axial longitudinal part-sectional view, showing the fundamental design of an electromotive, cable-operated window-lifter actuator unit.

In an axial, longitudinal part-sectional view, FIG. 1 shows the basic design of an electromotive, cable-operated window-lifter actuator unit for a motor vehicle. This unit contains a driving motor 1 (only schematically indicated), whose extended rotor shaft projects as a worm shaft 11 into a cup-shaped gear housing 2, which is flange-mounted on the housing of the electrical driving motor 1. Worm shaft 11 mates with a worm wheel 3 in the gear housing 2. The worm wheel 3 is connected in a slaving relationship to a cable pulley in a cable-pulley housing 7. Cable-pulley housing 7 is screwed to the gear housing 2 and has cable outlet openings 71 for cable lines leading to a window-pane-lifter driving gear.

Figure 2:
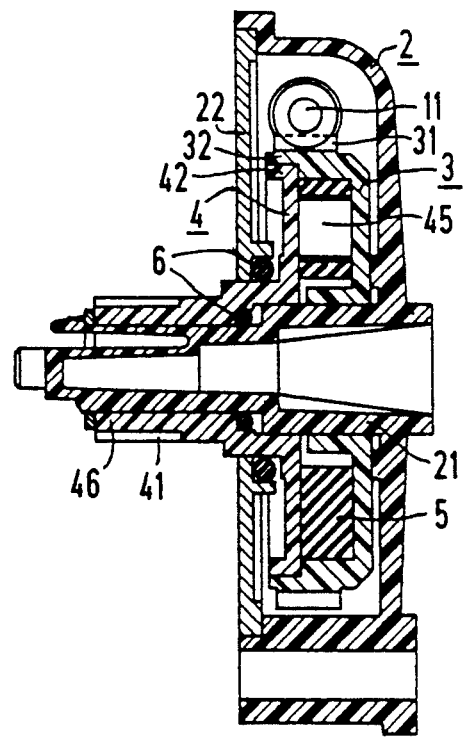
FIG. 2 is a radial cross-section according to the second profile II—II from FIG. 1. This figure shows the construction according to the invention, in the area of the two friction partners.

As is particularly apparent from FIG. 2, the worm wheel 3, which serves as a drive wheel and is driven by the worm shaft 11, is rotatably supported on a bearing bolt 21. The right end of bearing bolt 21, on the side of the gear unit, connects with the cup-shaped base of the gear housing 2 and is formed with this base as a one-piece molded component, which can be made of plastic. Servicing as torsional slaving between the worm wheel 3 and the cable pulley (not depicted in FIG. 2) is a slave disc 4 with an axially protruding, unattached shaft collar 46. Shaft collar 46 is provided over its circumference with an outer groove toothing 41 to which the cable pulley can be attached with a corresponding inner groove toothing. The gear housing 2 is sealed by a gear-housing cover 22. A sealing ring 6 in the form of an O-ring seal is used to provide a moisture-proof seal between the gear-housing cover 22 and the gear housing 2, as well as between the bearing bolt 21 and the shaft collar 46.

To provide for torsional slaving between the worm wheel 3 and the slave disc 4, which is disposed concentrically to the worm wheel 3, the slave disk 4 can have axially protruding slave cams 45 distributed over its periphery. These slave cams 45 mate with corresponding slave pockets of a damping liner 5 which is retained in the circumferential direction with a positive fit against the worm wheel 3. With its cup-shaped rim part 32, the worm wheel 3 overlaps both the damping liner 5 as well as the slave disc 4 to such an extent that the worm wheel 3 can brace itself radially on the outer rim part 42 of the slave disc 4, against the forces from the worm shaft 11 acting on its gear teeth.

Figure 3:
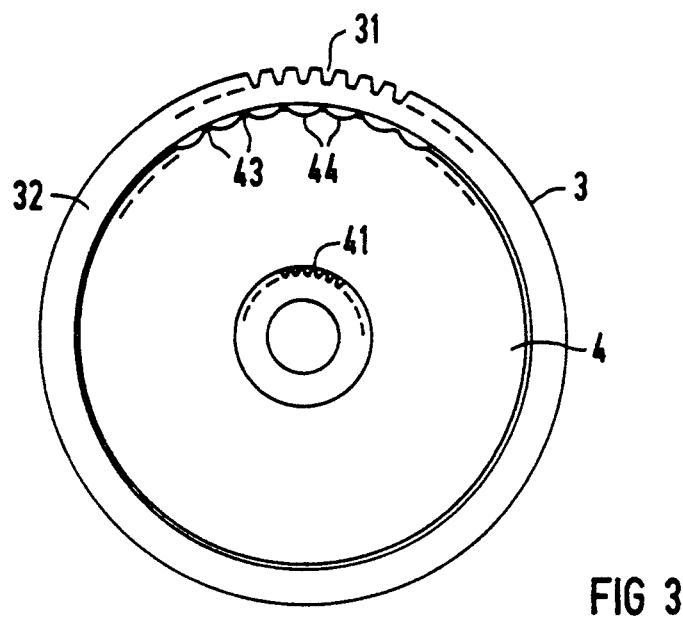
FIG. 3 is an axial top view of the outer front end of the driven or slave disc, corrugated on the outer surface, with an overlapping worm wheel.
Figure 4:
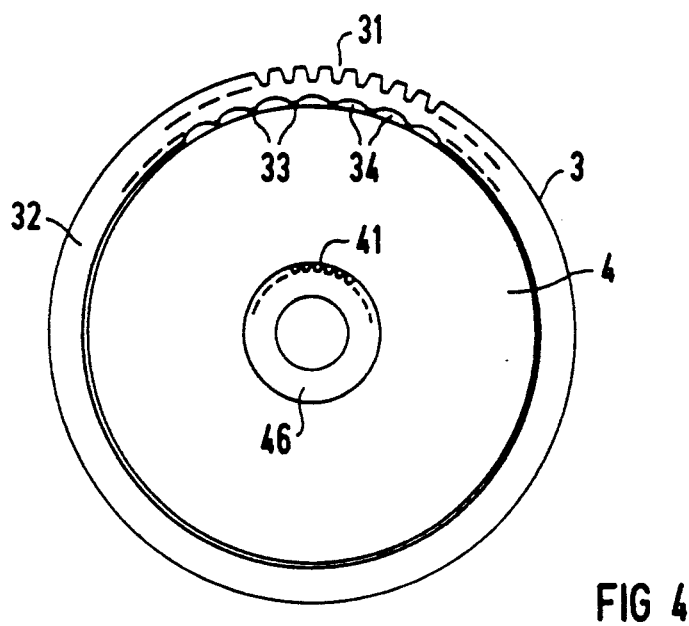
FIG. 4 is an axial top view of the worm wheel, corrugated on the inner circumference of its cup-shaped rim, and the axially overlapped driven or slave disc.

The at least tangentially elastic damping liner 5 allows a certain tangential relative movement between the worm wheel 3 and the slave disc 4. In order for squeaking noises to be avoided between the cup-shaped rim part 32 and the outer rim part 42, two arrangement can be used. These arrangements are shown in FIGS. 3 and 4. The outer rim part 42 of the slave disc 4 (FIG. 3) or the cup-shaped rim part 32 of the worm wheel 3 (FIG. 4) is toothed in an undulating form in a way that there is a bracing action only between the radial elevations 43 of the slave disc 4 and the flat inner circumferential surface of the cup-shaped rim part 32 of the worm wheel 3, or between the radial elevations 33 of the worm wheel 3 and the flat outer circumferential surface of the outer rim part 42 of the slave disc 4. Also, the radial depressions 34 remaining between the radial elevations 33 or the depressions 44 remaining between the radial elevations 43 can be provided advantageously as spaces for storing lubricant.

I claim:

1. An actuating mechanism comprising:
   a drive device, the drive device having a first edge part;
   a slave device, the slave device having a second edge part, the first edge part engaging said second edge part;
   a damping device, the damping device being disposed between, and damping movement between, the drive device and the slave device;
   one of said first or second edge parts having an edge surface of uniform radial extent, the other of said first or second edge parts having an edge surface of non-uniform radial extent comprised of a plurality of elevations, said elevations abutting said one of said first or second edge parts, said other of said first or second edge parts comprising depressions situated between said elevations.

2. The actuating mechanism of claim 1, wherein:
   the depressions are pockets for storing a lubricant.

3. The actuating mechanism of claim 1, wherein:
   said edge surface of uniform radial extent is on said first edge part and said edge surface of non-uniform radial extent is on said second edge part.

4. The actuating mechanism of claim 1, wherein:
   said edge surface of non-uniform radial extent is on said first edge part and said edge surface of uniform radial extent is on said second edge part.

5. An actuating drive for lifting a window in a motor vehicle comprising:
   a worm shaft;
   a worm wheel driven by said worm shaft, said worm wheel having a cup-shaped rim part with worm gearing on a radially outer surface of said cup-shaped rim part, said worm gearing cooperating with said worm shaft;
   a slave disc, a radially inner surface of said cup-shaped rim cooperating with a radially outer surface of said slave disc, said slave disc being mounted concentrically with said worm wheel; and
   an elastic damping liner, said elastic damping liner being disposed axially between said worm wheel and said slave disc, said liner damping tangential movement between the worm wheel and the slave disc;
   the radially outer surface of said slave disc being toothed over its periphery with undulating radial elevations, said elevations cooperating with the radially inner surface of said worm wheel, wherein depressions are formed between the elevations.

6. An actuating drive for lifting a window in a motor vehicle comprising:
   a worm shaft;
   a worm wheel driven by said worm shaft, said worm wheel having a cup-shaped rim part with worm gearing on its radially outer surface, said worm gearing cooperating with said worm shaft;
   a slave disc, a radially inner surface of said cup-shaped rim part cooperating with a radially outer surface of said slave disc, said slave disc being mounted concentrically with said worm wheel; and
   an elastic damping liner, said elastic damping liner being disposed axially between said worm wheel and said slave disc, said liner damping tangential movement between the worm wheel and the slave disc;
   a radially inner surface of said cup-shaped rim part is toothed over its periphery with undulating radial elevations, said elevations cooperating with the radially outer surface of said slave disc, wherein depressions are formed between the elevations.

* * * * *